US011468705B1

(12) United States Patent
Liao et al.

(10) Patent No.: US 11,468,705 B1
(45) Date of Patent: Oct. 11, 2022

(54) DISPLAY DEVICE WITH A FINGERPRINT SENSING FUNCTION

(71) Applicant: Novatek Microelectronics Corp., Hsinchu (TW)

(72) Inventors: Po-Jui Liao, New Taipei (TW); Yu-Hsiang Huang, Taoyuan (TW); Kuei-Chung Chang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/352,388

(22) Filed: Jun. 21, 2021

(51) Int. Cl.
| G09G 5/00 | (2006.01) |
| G06V 40/12 | (2022.01) |
| H01L 27/32 | (2006.01) |
| G06F 21/84 | (2013.01) |
| G06F 21/32 | (2013.01) |
| G06V 40/13 | (2022.01) |

(52) U.S. Cl.
CPC .......... *G06V 40/1347* (2022.01); *G06F 21/32* (2013.01); *G06F 21/84* (2013.01); *G06V 40/1318* (2022.01); *H01L 27/3234* (2013.01)

(58) Field of Classification Search
CPC ........... G06V 40/1347; G06V 40/1318; G06F 21/32; G06F 21/84; G06F 3/046; G06F 3/0446; G06F 2203/04106; H01L 27/3234
USPC ....................................................... 345/156
See application file for complete search history.

(56) References Cited

U.S. PATENT DOCUMENTS

| 9,146,632 | B2 | 9/2015 | Miyamoto | |
| 10,331,939 | B2 | 6/2019 | He et al. | |
| 2014/0118287 | A1 | 5/2014 | Miyamoto | |
| 2014/0218645 | A1 | 8/2014 | Miyamoto | |
| 2017/0280052 | A1* | 9/2017 | Zhou | ...................... H04N 5/232 |
| 2018/0301494 | A1* | 10/2018 | Park | .................... H01L 27/3234 |
| 2019/0012512 | A1 | 1/2019 | He et al. | |
| 2019/0222752 | A1* | 7/2019 | Burstein | .............. H04N 5/2224 |
| 2021/0055826 | A1 | 2/2021 | Park et al. | |
| 2021/0064841 | A1* | 3/2021 | Kim | ........................ G06F 3/046 |

FOREIGN PATENT DOCUMENTS

| CN | 210091189 | 2/2020 |
| TW | 201301112 | 1/2013 |
| WO | 2021036326 | 3/2021 |

OTHER PUBLICATIONS

"Office Action of Taiwan Counterpart Application", dated May 31, 2022, p. 1-p. 3.

* cited by examiner

Primary Examiner — Jennifer T Nguyen
(74) Attorney, Agent, or Firm — JCIPRNET

(57) ABSTRACT

A display device with a fingerprint sensing function is provided. The display device includes a display panel and a sensor panel. The display panel includes a plurality of display pixels. The sensor panel is disposed under the display panel. The sensor panel includes a plurality of sensor pixels arranged in an array. The array has a first sensor pitch in a first direction. Each of the sensor pixels includes a sensor. Every two neighboring sensors of the sensors have a first shift pitch in the first direction, and the first shift pitch is not equal to the first sensor pitch.

9 Claims, 5 Drawing Sheets

DISPLAY DEVICE WITH A FINGERPRINT SENSING FUNCTION

BACKGROUND

Technical Field

The invention generally relates to a display device and an electronic circuit. More particularly, the invention relates to a display device with a fingerprint sensing function and an electronic circuit for driving and controlling the display device.

Description of Related Art

In recent years, demands for fingerprint sensing have been gradually increased. In order to reduce a volume of an electronic device, a fingerprint sensing region may overlap with a display region of the electronic device. For example, an under-display fingerprint identification technique is to embed fingerprint sensors to a display panel, and the fingerprint sensor may sense or capture a fingerprint image through the display panel. Due to the overlap of the display panel and the sensor panel, Moiré pattern may happen to affect sensing quality.

SUMMARY

The invention is directed to a display device with a fingerprint sensing function, in which Moiré pattern can be reduced to improve sensing quality. In addition, an electronic circuit for driving the display device is also provided.

An embodiment of the invention provides a display device with a fingerprint sensing function. The display device includes a display panel and a sensor panel. The display panel includes a plurality of display pixels. The sensor panel is disposed under the display panel. The sensor panel includes a plurality of sensor pixels arranged in an array. The array has a first sensor pitch in a first direction. Each of the sensor pixels includes a sensor. Every two neighboring sensors of the sensors have a first shift pitch in the first direction, and the first shift pitch is not equal to the first sensor pitch.

An embodiment of the invention provides an electronic circuit including a fingerprint sensing circuit. The fingerprint sensing circuit is configured to drive and control the display device to sense a fingerprint image on the display panel.

In an embodiment of the invention, the sensors include a first sensor, a second sensor and a third sensor. The first shift pitch between the first sensor and the second sensor is not equal to the first shift pitch between the second sensor and the third sensor.

In an embodiment of the invention, the array further has a second sensor pitch in a second direction, and the second direction is perpendicular to the first direction. Every two neighboring sensors of the sensors have a second shift pitch in the second direction, and the second shift pitch is not equal to the second sensor pitch.

In an embodiment of the invention, the sensors further include a fourth sensor and a fifth sensor. The second shift pitch between the first sensor and the fourth sensor is not equal to the second shift pitch between the fourth sensor and the fifth sensor.

In an embodiment of the invention, the sensor pixels are grouped into a plurality of pixel groups. Each of the pixel groups comprises plural sensor pixels. Every two neighboring pixel groups of the pixel groups have a first group shift pitch in the first direction. The pixel groups include a first pixel group, a second pixel group and a third pixel group. The first group shift pitch between the first pixel group and the second pixel group is equal to the first group shift pitch between the second pixel group and the third pixel group.

In an embodiment of the invention, every two neighboring pixel groups of the pixel groups have a second group shift pitch in the second direction. The pixel groups further include a fourth pixel group and a fifth pixel group. The second group shift pitch between the first pixel group and the fourth pixel group is equal to the second group shift pitch between the fourth pixel group and the fifth pixel group.

In an embodiment of the invention, the sensor panel is configured to sense a fingerprint image through the display panel.

In an embodiment of the invention, the display panel is an organic light-emitting diode panel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." The term "signal" can refer to a current, a voltage, a charge, a temperature, data, electromagnetic wave or any one or multiple signals. In addition, the term "and/or" can refer to "at least one of". For example, "a first signal and/or a second signal" should be interpreted as "at least one of the first signal and the second signal".

Figure 1:
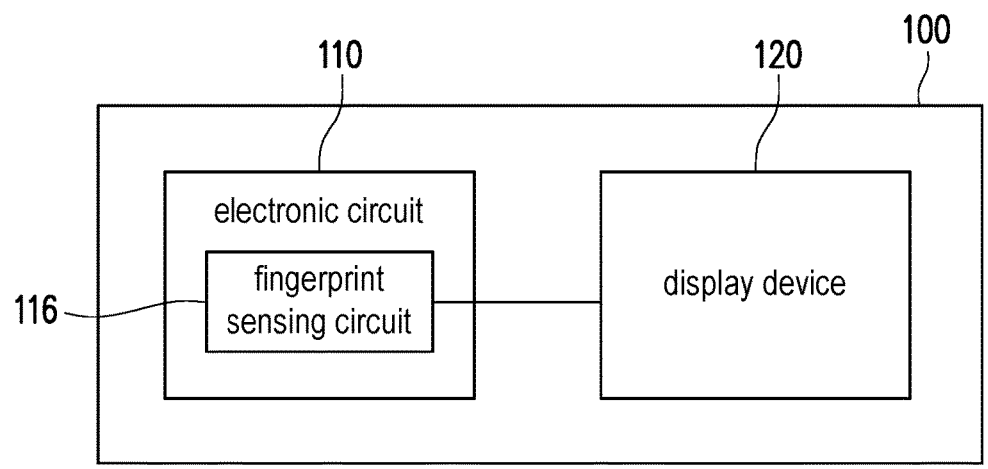
FIG. 1 is a schematic block diagram illustrating an electronic device according to an embodiment of the invention.

FIG. 1 is a schematic block diagram illustrating an electronic device according to an embodiment of the invention. Referring to FIG. 1, the electronic device 100 of the present embodiment includes an electronic circuit 110 and a display device 120. The display device 120 at least includes a plurality of display pixels and a plurality of fingerprint sensors. The electronic circuit 110 is configurable to be coupled to the display device 120. The electronic circuit 110 is adapted to drive the display device 120.

In the present embodiment, the electronic device 100 may be an electronic device having a display function, a touch sensing function and a fingerprint sensing function. In an embodiment, the electronic device 100 may be, but not limited to, a smartphone, a non-smart phone, a wearable electronic device, a tablet computer, a personal digital assistant, a notebook and other portable electronic devices that can operate independently and have the display function, the touch sensing function and the fingerprint sensing function. In an embodiment, the electronic device 100 may be, but not limited to, a portable or un-portable electronic device in a vehicle intelligent system. In an embodiment, the electronic device 100 may be, but not limited to, intelligent home appliances such as, a television, a computer, a refrigerator, a washing machine, a telephone, an induction cooker, a table lamp and so on.

Figure 2:
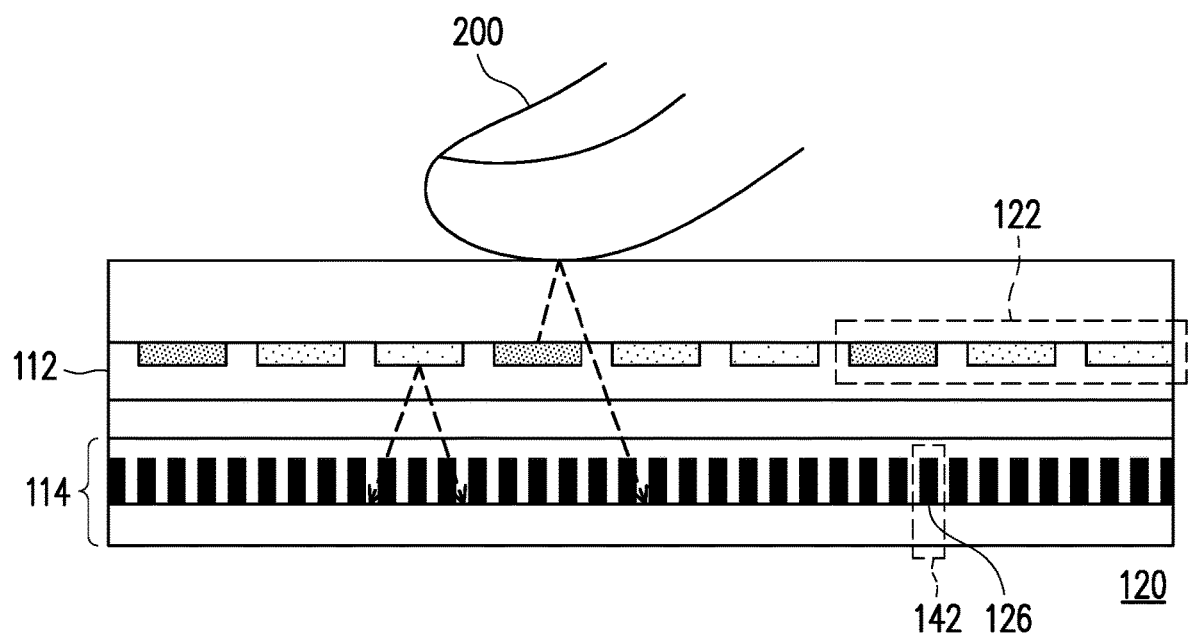
FIG. 2 is a schematic diagram illustrating the display device depicted in FIG. 1.

FIG. 2 is a schematic diagram illustrating the display device depicted in FIG. 1. Referring to FIG. 1 to FIG. 2, the display device 120 includes a display panel 112 and a sensor panel 114. The display panel 112 includes a plurality of display pixels 122. The display panel 112 may be an organic light-emitting diode panel, but the invention is not limited thereto. The sensor panel 114 is disposed under the display panel 112. The sensor panel 114 is configured to sense a fingerprint image of a finger 200 through the display panel 112. The sensor panel 114 includes a plurality of sensor pixels 142 arranged in an array. Each of the sensor pixels 142 includes a sensor 126. In an embodiment, the sensor 126 may include a collimator.

The electronic circuit 110 at least includes a fingerprint sensing circuit 116. In an embodiment, the electronic circuit 110 may further include a display driving circuit and/or a touch sensing circuit. The fingerprint sensing circuit 116 is configured to drive and control the display device 120 to sense the fingerprint image on the display panel 112 via fingerprint scan lines and fingerprint sensing lines (not shown). The fingerprint sensing circuit 116 receives fingerprint sensing signals corresponding to the fingerprint image from the sensor pixels 142 and may also process the fingerprint sensing signals to obtain the fingerprint image. The fingerprint sensing circuit 116 may include a digital circuit, an AFE circuit, an ADC circuit and other functional circuits for performing the fingerprint sensing operation.

In the embodiment that the electronic circuit 110 includes the display driving circuit, the touch sensing circuit and/or the fingerprint sensing circuit, the electronic circuit 110 may be implemented as a single semiconductor chip. When the electronic circuit 110 is implemented as a single-chip integrated circuit that can drive and control the display device 120 to perform the display operation, the touch sensing operation and/or the fingerprint sensing operation, the electronic circuit 110 may also include a control circuit, and the control circuit may be a micro-controller based core to perform all of control activities of the display operation, the touch sensing operation and the fingerprint sensing operation. The control circuit may include at least one of the timing controller, the touch controller, the digital circuit, and the other controllers or processors of a display driving circuit.

Figure 3:
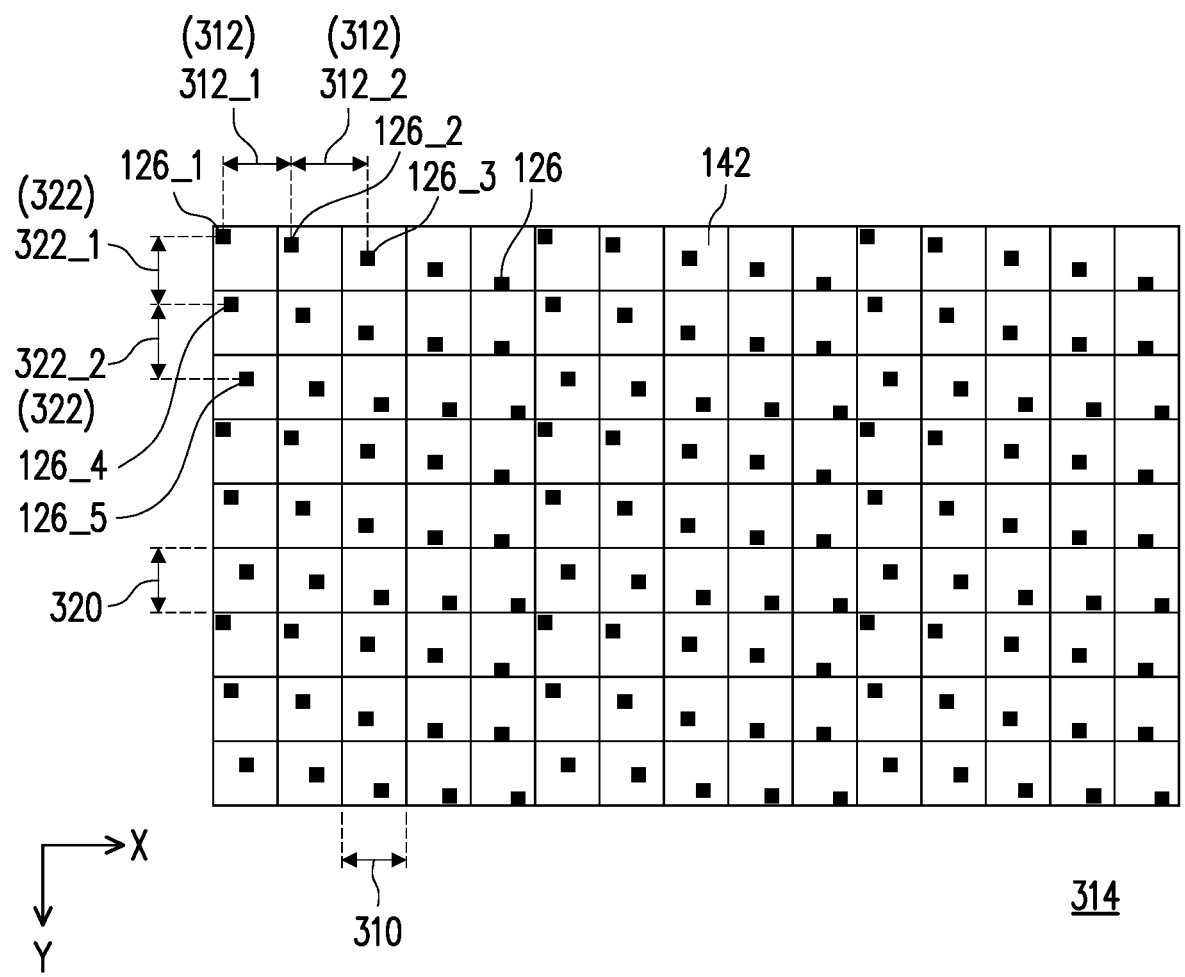
FIG. 3 shows a schematic diagram of a sensor panel according to an embodiment of the invention.

FIG. 3 shows a schematic diagram of a sensor panel according to an embodiment of the invention. Referring to FIG. 3, the sensor panel 314 includes a plurality of sensor pixels 142 arranged in an array. The array has a first sensor pitch 310 in a first direction X and a second sensor pitch 320 in a second direction Y. The second direction Y is perpendicular to the first direction X. Each of the sensor pixels 142 includes a sensor 126 for fingerprint sensing. Every two neighboring sensors 126 have a first shift pitch 312 in the first direction X and a second shift pitch 322 in the second direction Y.

To reduce Moiré pattern, the first shift pitch 312 is set to be not equal to the first sensor pitch 310. In addition, the first shift pitches 312 between the neighboring sensors 126 are not equal. For example, the first shift pitch 312_1 between the first sensor 126_1 and the second sensor 126_2 is not equal to the first shift pitch 312_2 between the second sensor 126_2 and the third sensor 126_3. That is to say, in the first direction X, $\Delta X(n1) \neq \Delta X(n1+m1) \neq \Delta X\_pitch$, where $\Delta X(n1)$ is the first shift pitch between two neighboring sensors in the first direction X, $\Delta X(n1+m1)$ is the first shift pitch between another two neighboring sensors in the first direction X, and $\Delta X\_pitch$ is the first sensor pitch, and n1 and n1+m1 are positive numbers smeller than a column number of the array.

On the other hand, the second shift pitch 322 is set to be not equal to the second sensor pitch 320. In addition, the second shift pitches 322 between the neighboring sensors 126 are not equal. For example, the second shift pitch 322_1 between the first sensor 126_1 and the fourth sensor 126_4 is not equal to the second shift pitch 322_2 between the fourth sensor 126_4 and the fifth sensor 126_5. That is to say, in the second direction Y, $\Delta Y(n2) \neq \Delta Y(n2+m2) \neq \Delta X\_pitch$, where $\Delta Y(n2)$ is the second shift pitch between two neighboring sensors in the second direction Y, $\Delta Y(n2+m2)$ is the second shift pitch between another two neighboring sensors in the second direction Y, and $\Delta Y\_pitch$ is the second sensor pitch, and n2 and n2+m2 are positive numbers smeller than a row number of the array.

Figure 4:
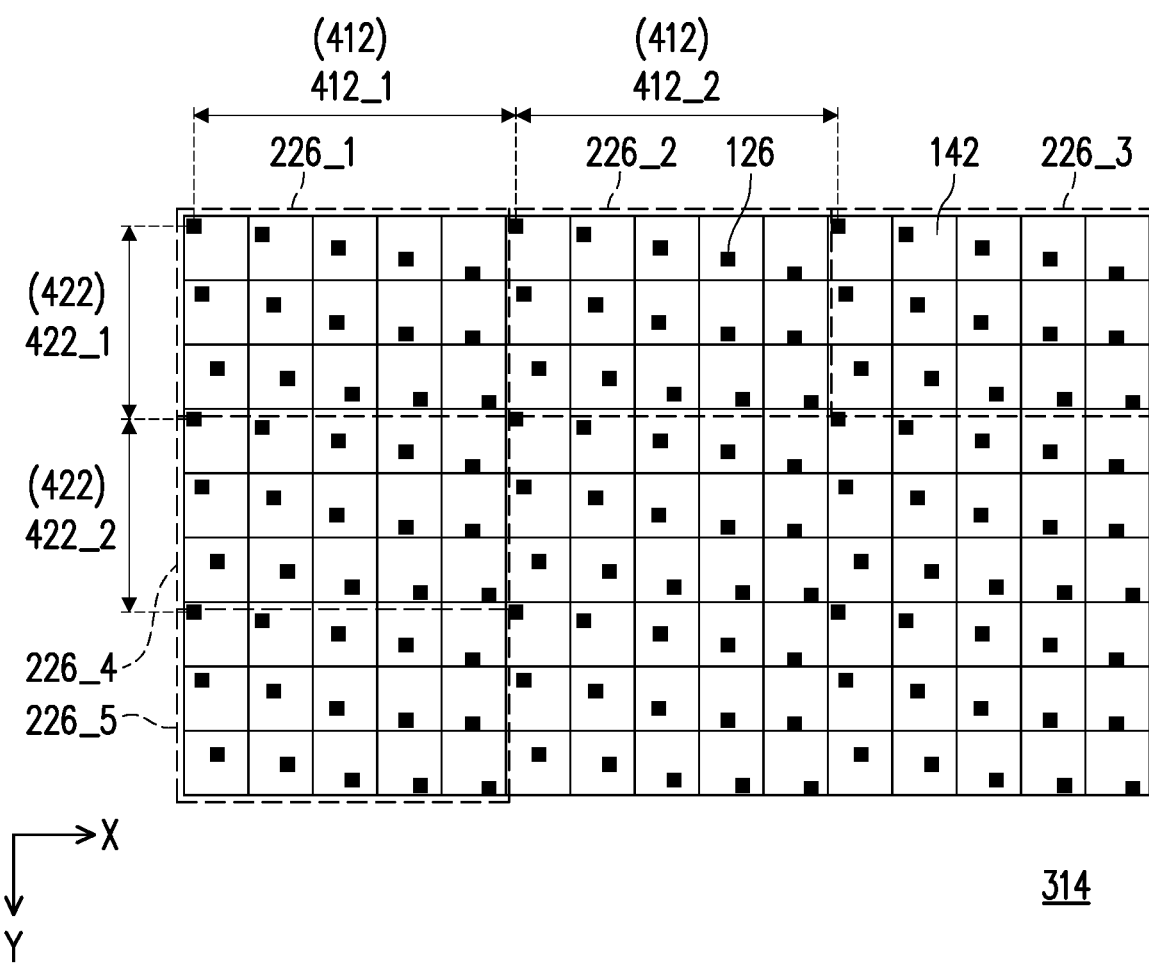
FIG. 4 shows a schematic diagram of a sensor panel according to an embodiment of the invention.

FIG. 4 shows a schematic diagram of a sensor panel according to an embodiment of the invention. Referring to FIG. 4, in addition to set shift pitches between two neighboring sensors, shift pitches between pixel groups can also be set for reducing Moiré pattern.

To be specific, the sensor pixels 126 are grouped into a plurality of pixel groups 226, and each of the pixel groups 226 includes plural sensor pixels 126. Every two neighboring pixel groups 226 have a first group shift pitch 412 in the first direction X and a second group shift pitch 422 in the second direction Y. The first group shift pitch 412_1 between the first pixel group 226_1 and the second pixel group 226_2 is set to be equal to the first group shift pitch 412_2 between the second pixel group 226_2 and the third pixel group 226_3. The second group shift pitch 422_1 between the first pixel group 226_1 and the fourth pixel group 226_4 is equal to the second group shift pitch 422_2 between the fourth pixel group 226_4 and the fifth pixel group 226_5.

That is to say, $G\Delta X(n3)=G\Delta X(n3+m3)$; and $G\Delta Y(n4)=G\Delta Y(n4+m4)$, where $G\Delta X(n3)$ is the first group shift pitch between two neighboring pixel groups in the first direction X, $G\Delta X(n3+m3)$ is the first group shift pitch between another two neighboring pixel groups in the first direction X, $G\Delta Y(n4)$ is the second group shift pitch between two neighboring pixel groups in the second direction Y, $G\Delta Y(n4+m4)$ is the second group shift pitch between another two neighboring pixel groups in the second direction Y. In addition, n3 and n3+m3 are positive numbers smeller than a group number in the first direction X, and n4 and n4+m4 are positive numbers smeller than a group number in the second direction Y.

Figure 5:
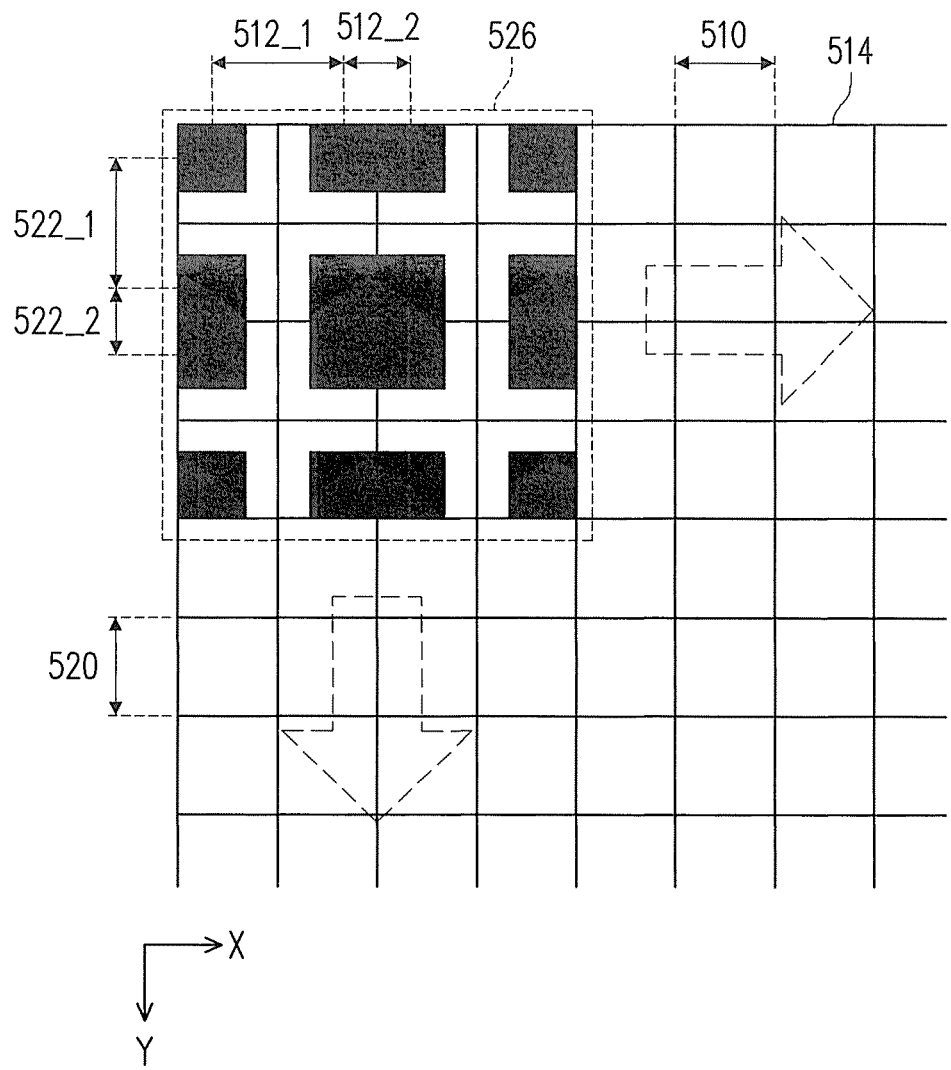
FIG. 5 shows a schematic diagram of a sensor panel according to an embodiment of the invention.

FIG. 5 shows a schematic diagram of a sensor panel according to an embodiment of the invention. Referring to FIG. 5, the sensor panel 514 includes a plurality of pixel groups 526. The pixel groups 526 are reported in the first direction X and the second direction Y to reduce Moiré pattern. In the first direction X, the first shift pitches 512_1 and 512_2 are not equal to the first sensor pitch 510, and the first shift pitches 512_1 and 521_2 between the neighboring sensors 126 are not equal. In the second direction Y, the second shift pitches 522_1 and 522_2 are not equal to the second sensor pitch 520, and the second shift pitches 522_1 and 522_2 between the neighboring sensors are not equal. In addition, the group shift pitches between the pixel groups 526 in the first direction X and the second direction Y are set to be equal.

Figure 6:
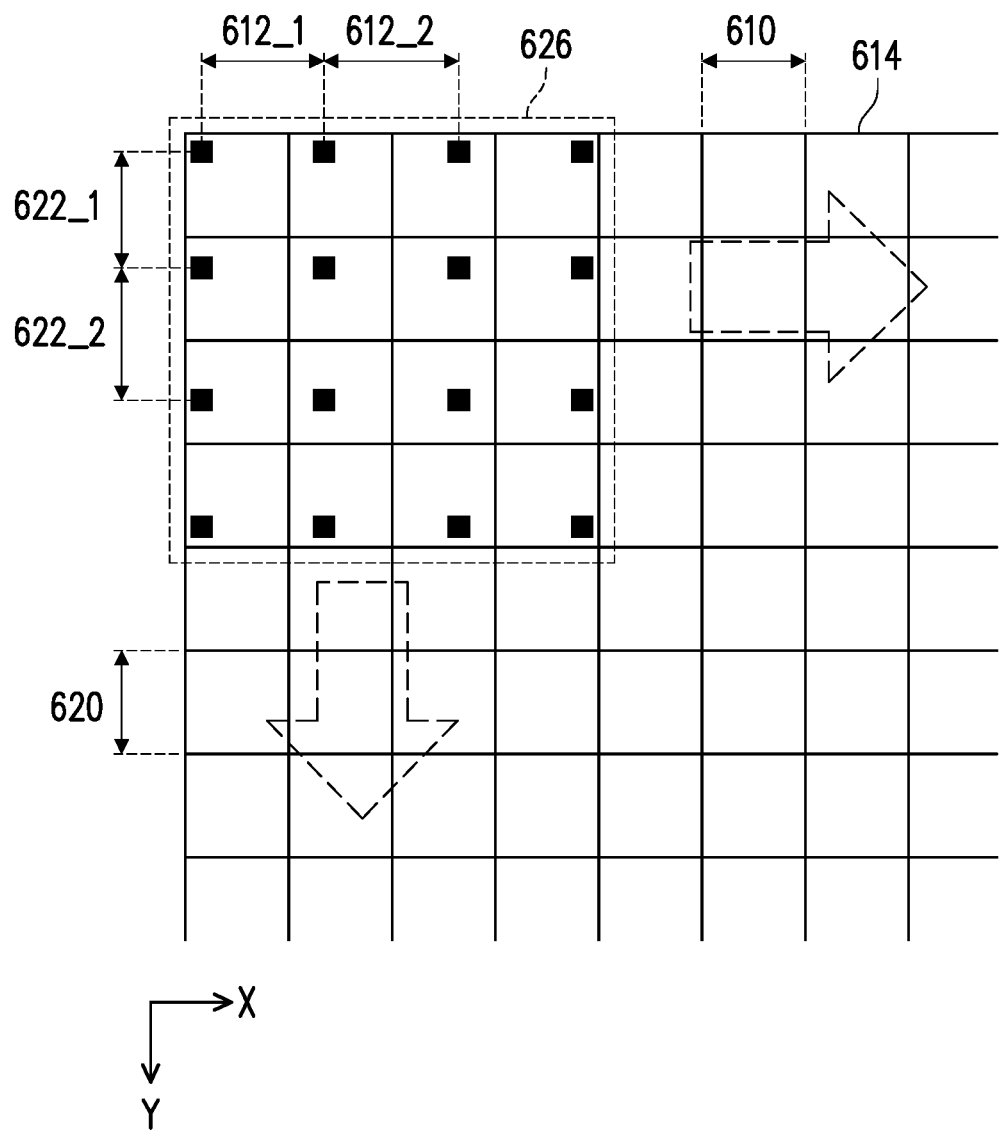
FIG. 6 shows a schematic diagram of a sensor panel according to an embodiment of the invention.

FIG. 6 shows a schematic diagram of a sensor panel according to an embodiment of the invention. Referring to FIG. 6, the sensor size of the present embodiment is smaller than the sensor size of FIG. 5. The sensor panel 614 includes a plurality of pixel groups 626. The pixel groups 626 are reported in the first direction X and the second direction Y to reduce Moiré pattern. In the first direction X, the first shift pitches 612_1 and 612_2 are not equal to the first sensor pitch 610, and the first shift pitches 612_1 and 621_2 between the neighboring sensors 126 are not equal. In the second direction Y, the second shift pitches 622_1 and 622_2 are not equal to the second sensor pitch 620, and the second shift pitches 622_1 and 622_2 between the neighboring sensors are not equal. In addition, the group shift pitches of the pixel groups 626 in the first direction X and the second direction Y are set to be equal.

In summary, in the embodiments of the invention, the shift pitch of the sensors is set to be not equal to the pixel pitch and other shift pitches, and the group shift pitches are set to be equal in a specified direction. Therefore, Moiré pattern can be reduced to improve sensing quality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device with a fingerprint sensing function, the display device comprising:
    a display panel comprising a plurality of display pixels; and
    a sensor panel disposed under the display panel and comprising a plurality of sensor pixels arranged in an array, wherein the array has a first sensor pitch in a first direction,
    wherein each of the sensor pixels comprises a sensor, every two neighboring sensors of the sensors have a first shift pitch in the first direction, and the first shift pitch is not equal to the first sensor pitch,
    wherein the sensor pixels are grouped into a plurality of pixel groups, and each of the pixel groups comprises plural sensor pixels, wherein a pixel unit is mirrored to form the pixel group according to at least one axis, and the pixel unit comprises plural sensor pixels.

2. The display device of claim 1, wherein the sensors comprise a first sensor, a second sensor and a third sensor, and the first shift pitch between the first sensor and the second sensor is not equal to the first shift pitch between the second sensor and the third sensor.

3. The display device of claim 2, wherein the array further has a second sensor pitch in a second direction, and the second direction is perpendicular to the first direction, wherein every two neighboring sensors of the sensors have a second shift pitch in the second direction, and the second shift pitch is not equal to the second sensor pitch.

4. The display device of claim 3, wherein the sensors further comprise a fourth sensor and a fifth sensor, and the second shift pitch between the first sensor and the fourth sensor is not equal to the second shift pitch between the fourth sensor and the fifth sensor.

5. The display device of claim 1, wherein every two neighboring pixel groups of the pixel groups have a first group shift pitch in the first direction,
    wherein the pixel groups comprise a first pixel group, a second pixel group and a third pixel group, and the first group shift pitch between the first pixel group and the second pixel group is equal to the first group shift pitch between the second pixel group and the third pixel group.

6. The display device of claim 5, wherein every two neighboring pixel groups of the pixel groups have a second group shift pitch in the second direction,
    wherein the pixel groups further comprise a fourth pixel group and a fifth pixel group, and the second group shift pitch between the first pixel group and the fourth pixel group is equal to the second group shift pitch between the fourth pixel group and the fifth pixel group.

7. The display device of claim 1, wherein the sensor panel is configured to sense a fingerprint image through the display panel.

8. The display device of claim 1, wherein the display panel is an organic light-emitting diode panel.

9. An electronic circuit comprising a fingerprint sensing circuit, wherein the fingerprint sensing circuit is configured to drive and control the display device of claim 1 to sense a fingerprint image on the display panel.

* * * * *